United States Patent Office 3,556,600
Patented Jan. 19, 1971

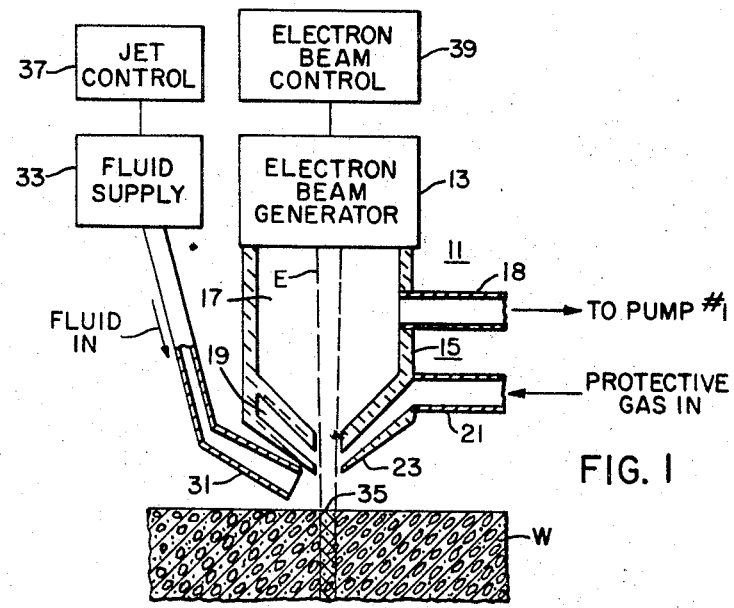
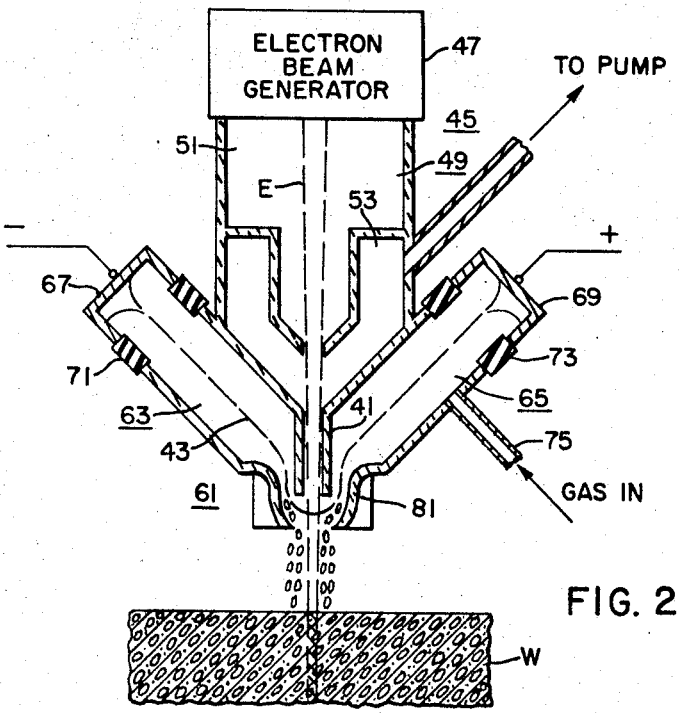

3,556,600
DISTRIBUTION AND CUTTING OF ROCKS,
GLASS AND THE LIKE
William E. Shoupp and Berthold W. Schumacher, Pittsburgh, Pa., assignors to Westinghouse Electric Corporation, Pittsburgh, Pa., a corporation of Pennsylvania
Filed Aug. 30, 1968, Ser. No. 756,653
Int. Cl. E21c 37/18
U.S. Cl. 299—14         28 Claims

ABSTRACT OF THE DISCLOSURE

A method is disclosed for drilling holes, excavating and/or tunneling in rocky terrain or cutting or breaking up rock or glass with a corpuscular beam, of electrons or ions of high energy density, typically exceeding about $10^6$ watts per square centimeter. The beam is projected into the atmosphere from the chamber in which it is generated. Molten material, fumes and dust may be blasted away by a stream of gas, water or steam. The surface being impinged by the beam may advantageously be under water. The particles of the beam may also have very high energy (accelerating voltage one million to 100 million volts) to produce a blasting effect under the surface of the material being disrupted.

BACKGROUND OF THE INVENTION

This invention relates to the art of excavating and of cutting rocks and related materials such as glass and the like. The word "rock" as used in this application includes within its scope the hard geologic formations which are commonly recognized as rock or stone and in addition such materials as cement block, Belgian Block street paving and the like and also such materials as glass, metal, ceramics and quartz, or ceramic-filled epoxy resin or epoxy resin filled with refractory material such as aluminum oxide.

In excavating to build tunnels or for foundations the massive rock formations which are encountered present serious difficulties. It is necessary to cut through them but this is not readily accomplished with reasonable labor cost with the ordinary digging rigs which are available. In accordance with the teachings of the prior art the rocky formations are first disrupted by explosions and the debris is then removed by the available earth moving equipment. But this practice presents serious problems particularly when carried out in populated areas. The explosions not only constitute a danger but their disruptive effects do not confine themselves to the disruption of the rocks; they damage the homes within at least one-half mile to a mile from the explosion. Most courts have long held that liability attaches to such damage on proof, without more, of the blasting and the insurance for an excavating operation in a populated area is an appreciable item of cost.

In accordance with the teachings of the prior art, excavation is also carried out by mechanical cutting and drilling. But the cutting or drilling of rock by mechanical cutters is costly. During the past 20 years means have also been devised to accomplish the same purpose by the use of so-called jet flames. Some kinds of rock are sensitive to thermal stress cracking and they can be broken or weakened by thermal methods. For instance, jet flames can be directed against the face of the rock and, under the thermal stresses, the rock cracks or exhibits spallation, whereby small chips and flakes burst off the heated surface. This is usually the case when some crystalline components of the rock structure undergo a phase transition at a relatively low temperature and where this phase transition is associated by a considerable change in specific volume. The well-known commercial process of this type is the "Linde Jet Piercing" method. This jet piercing method has been found economically attractive for cutting and drilling hard rocks like jasper and taconite. The method has not only found widespread acceptance in this country but also in Russia.

The jet flame which is used for the thermal degrading and breaking of the rock is produced by a mixture with oxygen of various kinds of common fuels like methane, kerosene, or oil. It has been found that a flame burning only with air is not hot enough to accomplish the purpose. It has also been found that certain types of rock withstand the attack of this flame even when the fuel is burned with oxygen.

The above-mentioned jet flame method of cutting rocks is a process where the heat from the flame passes into the rock by heat conduction. The efficiency of the process depends on the heat conductivity of the burned-off or vaporized top layers of the attacked rock. In a situation where, due to the chemical decomposition of the rock at the higher temperatures, reaction products are produced which are good heat insulators, and also opaque to heat radiation from the flame, the jet piercing process loses its efficiency. The insulating and radiation blocking properties of the reaction products set a natural limit to the heat transfer by any kind of radiative or heat conduction process. These blocking properties also set a limit in the process of piercing rocks by laser pulses which has recently been considered. In this case the plasma produced by the vaporized material from the surface becomes non-transparent, namely a black body, for just the radiation which carries the energy. Further energy transport to lower layers of the treated rock material again depends only on heat conduction and the thermal insulating products of reaction militate against conduction.

It is an object of this invention to overcome the above-described disadvantages of the prior art and to provide a method of excavating through rock-bearing terrain which shall demand a minimum of blasting with explosives to disrupt rock formations or masses and shall not have the disadvantages of the jet heating or laser processes.

An incidental object of this invention is to provide a method of effectively cutting masses of rock into sections.

Another incidental object of this invention is to provide a method for drilling holes in rocks for blasting and the like.

Another incidental object of this invention is to provide a method of cutting glass panes or the like.

SUMMARY OF THE INVENTION

This invention arises from the realization that energy transfer to a solid body can be accomplished without recourse to heat transfer, if this solid body is bombarded by corpuscular particles. Electron beams or ion beams can serve two purposes, (a) heat and disintegrate rocks on a thermal basis by supplying disintegrating energy by an electron beam or ion beam, and (b) degrade the rock on the basis of what may be called radiation chemical processes, breaking up the molecular structure of the rock material by the corpuscular bombardment.

In accordance with this invention a method is provided for excavating through rocky terrain in whose practice the massive rocky formations are disrupted by impinging on the surface of the rocks a high-energy density corpuscular beam from apparatus for producing and emitting such a beam into the atmosphere. Typically, the beam may be an electron beam having an energy concentration exceeding $10^6$ watts per square centimeter and particle energies of the order of 100 kv. to 500 kv. Such a beam may be produced with the apparatus shown in Schopper-Schumacher Pat. 2,899,556, granted Aug. 11, 1959 or in Pat. 3,418,526, granted Dec. 24, 1968 to Harold C. Simon and Bernard Gerber for Power Supply Apparatus.

The Schopper-Simon patents are incorporated herein by reference. A beam in which the particles have very much higher energy, having been accelerated by one million to 100 million volts, may also be used with advantage. To produce such a beam the Marx generator, Van-de-Graff generator, the Betatron or the Dynamitron may be used.

Typically an electron beam of high power as well as high power density is directed against the surface of the rock. The high kinetic energy of the electrons causes them to penetrate the rock to a certain depth and impart their energy to the atoms and molecules of the rock. This causes an extremely high, localized heating, with subsequent melting or even sublimation and vaporization of the rock material. Such vaporization takes place especially along the axis of the beam, as long as the beam stays confined or, in other words, as long as the beam power density is not too far reduced due to scattering in the vapor, or due to initial beam spread. A low angular aperture, about ½ degree to 5 degrees, of the beam is therefore as desirable for our purpose as a high power density.

This invention is based partly on the realization that in materials of low atomic number, like rock or water, beam scattering is slight and in most cases heat conduction is low, hence the beam readily produces a superheated vapor channel along its path. This results in beam-penetration into water or rock which goes much deeper than, for instance, in metals (assuming equal beam power).

As a result of the above the major part of the beam energy is deposited at the bottom of this vapor channel which means at a depth of several inches below the rock surface at high power densities. Yet even here the before-mentioned advantage of particle penetration rather than heat conduction producing the energy transfer is maintained and effective. Finally, in this process the material is removed from the impact area of the electron beam by boiling away of liquid drops or by vaporization, and in the course of this process the electron beam drills a deeper and deeper hole for itself. If now the electron beam is moved across the surface of the rock a cutting action can be accomplished as well.

In the practice of this invention the high power, high density corpuscular beam may also be used to cut a mass or slab of rock into sections. The process according to this invention has been found to be highly effective and successful by applying the high power electron beams, with a total energy of 5 to 10 kw. to various specimens of rock and concrete. For instance, the 5 kw. beam has cut through a 1"-thick slab of concrete at a speed of approximately 6" per minute. If the piece is thicker than 1" a clean cut is not accomplished with the 5 kw. beam, but a piece several inches thick can be broken readily along the cutting line of the electron beam although penetration may only be 1".

Disruption of disintegration of rock may also be effected by directing a stationary beam against the surface of the rock. Typically it has been found that a 9 kw. beam left stationary for about 30 seconds drills a hole in the sandstone which is 3" deep, roughly pear-shaped, and about ⅝" wide at the location of the largest diameter. It has also been observed that a piece of rock under these conditions shatters and fractures into several smaller pieces by reason of the thermal stresses induced during this process. The beam not only effects a cutting action but also serves for "thermal blasting."

The above-mentioned feature of this method, namely that the beam travels in a self-generated narrow superheated vapor channel to a depth of several inches, and the main part of the beam energy is given up only when and where the beam spreads i.e., at the bottom of the vapor cavity, is of particular advantage for thermal blasting. The heat is applied several inches below the surface hence increasing the effect of the thermal stresses.

While cutting at higher speeds it was observed in the case of concrete that a glassy melt was produced which resolidified into a glassy hard substance when the electron beam had passed-on, and which kept the "cut" pieces still together although they could be broken apart by a slight force. It is desirable to avoid this glassy resolidification.

In addition it has been observed while cutting concrete, sandstone and granite with the electron beam, especially when using powers of 8 to 10 kw., that liquid masses, similar to lava, are formed and produce at times foam and bubbles, on the surface of the rock, just underneath the nozzle of the electron gun. The exit nozzle of the electron gun is a small distance from the surface of the rock, typically at a distance of about ⅛ to ¼ inch, this foamy material sticks between the electron gun and the rock interfering with the free movement of the electron gun. Another difficulty was observed when cutting marble. In this case there is no liquid phase but clouds of dust are emitted from the area where the electron beam impinges on the marble. Although a protective gas flow emerges from the exit nozzle of the electron gun some of this dust, probably expelled with high velocity from the impact area, enters the electron gun and penetrates into the electron-beam acceleration chamber; there it causes arcs and sparks shutting off the electron gun.

These difficulties can be avoided by cutting the rock under water or by blasting away the molten material or the dust with a jet of water, steam or gas.

As indicated an ion beam can be used in place of an electron beam. The advantage of an ion beam is the reduced rate of X-ray production even for a high-power beam. It is feasible to cut rocks with an iron gun, equipped with beam transfer stages to atmospheric pressure, without an X-ray shielding enclosure; a relatively light lead-rubber apron for the operator is all the shielding that is required. This is of great practical and econimical advantage for a fieldmobile rock cutting beam gun.

In all the following discussions it shall be understood that the terms electron gun also implies the possible use of ion guns.

FURTHER ELABORATION ON THE INVENTION

In arriving at this invention it has been realized that the energy interaction of the rock and the corpuscular beam is different from, and has none of the limitations of, the energy input by thermal radiation or the physical effects of explosion. Thermal energy interacting with the surface of a rock results in the giving off of vapors of the decomposition products, for instance water vapor from absorbed or absorbed water, or produced by the release of chemically bound water, so-called *crystal-water*. If this vaporization is heavy it produces blast-action, and a flame, or other heater, would be diverted from its original direction; if the vapor is mixed with dust and particles preventing the passage of light, or of thermal radiation, the vapor forms an effective barrier protecting the underlying rock layers from further heat input from the flame or from thermal radiation. This is not the case if the energy input is supplied by an electron or ion beam. The partical beam transmits its energy to the matter on which it impinges in proportion to the area density of this matter, expressed for instance in grams per square centimeter. It does not matter whether this matter is a gas, or a vapor, or a solid. If the particle or corpusular beam passes through the aforementioned vapor layer emitted from the surface of the rock it only loses a small fraction of its energy in this vapor zone; the preponderance energy still impinges on the underlying solid. The penetration of the particles into the solid matter is a process entirely unrelated to heat conduction or explosion. The process of energy penetration can proceed faster than it could if the energy had to be transmitted on the basis of heat conduction. It does not matter either whether or not the heat conduction parameters change in the process of vaporation. Any hydrodynamic action produced by the vapor, effecting, for instance, the above mentioned flame, has no effect in case of energy input by means of corpuscular beams. The speed of the corpuscles in an electron or ion beam is so high that aerodynamic effects like turbulence of the vapor, do not affect the beam or the energy flux in the beam. In fact the vapor, particularly that due to the water frequently present in the rock, concrete or other material, appears, upon its violent exit from the area of bombardment, to assist in removing the heavier components of the cutting volume and it greatly assists in the process.

The thermal properties of the rock material have little influence on the thermal input, and therefore on the melting and vaporization process produced by a corpuscular beam. The melting temperature required partly determines the overall power needed for a certain cutting speed. The corpuscular beam, since it is not affected by hydrodynamic phenomena, can maintain a much higher power density than for instance a jet flame. It can therefore vaporize any kind of rock and drill itself into the rock simply on the basis of vaporization alone. In many instances this drilling process is speeded up by further shattering and cracking of the rock in the heat-affected zone.

This favorable behavior of corpuscular beams in comparison with flames also holds if the source of the vapor which may prevent heating by flames is not due to the chemical decomposition of the rock alone but, for instance, to the presence of water coming into the drilling zone from the outside. While a water layer may prevent heat input of sufficient magnitude from a jet flame it does not do so in the case of an electron beam, the power density in an electron or ion beam being high enough to vaporize any water flowing into the interaction zone. It is possible, in the practice of this invention, to cut and drill rocks which have so far withstood any conventional drilling by the jet-piercing method using the oxygen jet flame. In cutting tunnels particularly the beam can be directed angularly toward the tunnel face and triangular wedges removed. This can be followed by cutting up segments of the tunnel face. In cutting certain rocks, such as that found in Belgian Block street-paving, the very high energy localization at the melted area and the massive heat capacity of the block causes very high thermal stresses. This results in fracture planes near the cut enabling a block to be shattered and broken away in the volumes near the cut. For drilling holes where a continuous cut may not be practical (tunnel face) this is a particularly important and very favorable feature of this invention.

It is emphasized that with the corpuscular beam reliance is not placed alone or even predominately on heat conduction or heat transfer in disintegrating the rock. The electrons or ions penetrate and impart energy to the rock regardless of the thermal conductivity of the rock itself, or of any surface layer which may be formed by the decomposition products. An electron beam can be, and has been, successfully used for what may be called a "melt-cut." The rock is sliced by melting a narrow and deep slit into it by means of the electron beam. Typically, such a cut is 2" deep and ⅛ to ⅜" wide. While the melt-cutting technique works in every kind of rock, soft or hard, there are special kinds of rock which also exhibit thermal stress cracking. In this case, electron beams which are used customarily have a beam voltage of 150 kv., and serve first to drill a hole or slot by melt-cutting from the surface down, thereby transporting energy slowly deeper and deeper below the surface level of the rock face. The heat applied to and through the wall of the hole or slot leads finally to large scale thermal stress cracking of even large blocks of rock.

The electron beam cutting is more efficient than flame cutting because the cuts can be made narrower; it is uneconomical to melt large volumes of rock in the disintegration process. With two deep narrow cuts at an angle to one another large blocks of material can be cut out of a rock face, and only a fraction of this volume of rock needs to be melted.

It is a property of an electron beam that when this beam impinges on an absorber, the electrons of the beam lose their energy over a penetration distance which depends on the absorber. This distance is called the range. The maximum amount of energy released per unit volume does not take place at the surface of the absorber but at a depth if between ⅓ to ⅔ of the range. The energy is distributed in depth in accordance with what is called the depth-dose or energy-release function. The higher the accelerating voltage of the electron beam; that is, the kinetic energy of the electrons in the beam, the deeper below the surface of the absorber is the peak of this energy release function. For 150 kv. beams, the peak of the energy release function is about 2 to $3 \times 10^{-2}$ gms./cm.$^2$ below the surface. For electron beams of 5 to 50 million volts it is at a depth of 2 to 10 gms./cm.$^2$ corresponding to a linear depth of 0.2 to 0.6 cm.

The depth is expressed above in grams per square centimeters (gm./cm.$^2$) to take into consideration the density of the absorber. The data given in gm./cm.$^2$ above is the depth of penetration multiplied by the density; that is, depth in cm. $\times$ gm./cm.$^3$ = depth in gm./cm.$^2$.

In rocks which show thermal stress cracking, or what has been called spallation, it is advantageous to work with electron beams of a voltage as high as practicable in the practice of this invention to get the maximum energy release deep below the surface without heating the surface unnecessarily. This energy release below the surface resembles a small explosion under the surface. It lifts the surface layers with a minimum of energy loss to the surface layers. It causes tensile stresses in the surface layers, and all rocks are much weaker in the tensile mode as compared to the shear or compressional stress mode. In using electron beams in this way the above-mentioned advantage of the electron beam over flames or plasma torches is retained, namely there is no dependence on heat conduction, thermal conductivity parameters, and the like. Wherever possible this thermal cracking of the rock from the inside out is much more favorable use of the energy than melting large volumes. To make full use of this mode of practice of this invention, it is advantageous to operate with as high as practicable electron-beam voltages. Voltages of one million to 100 million volts are, in accordance with this invention, used for fracturing rocks which are sensitive to thermal stress or spallation. In this practice the electron beams can also be pulsed. The energy in each beam pulse can be chosen so as not to melt any of the rocks but sufficient for heating a certain volume well below the surface to a point where stress cracking occurs without melting. It is particularly opportune that high-voltage alternating current beam pulses are more readily produced than high voltage D-C beams. For producing a high-voltage beam pulse of high power one may use, for instance, the so-called Marx generator or such machines as Betatrons or Dynamitrons. The electrons can be brought to the atmosphere through windows, but also, and much preferably, through apertures and differentially pumped beam transfer stages, as used presently for low-voltage beams (100 to 300 kv).

The shorter the beam pulse (for a given energy) the better the energy utilization, because losses due to heat conduction are a slow, diffusive type of process. Electron beams lend themselves particularly well to fine control over energy deposition rate as well as total energy.

In the practice of this invention a glass body or the like can also be cut into sections. This cutting is most effectively carried out under water with apparatus capable of projecting high-power concentrated electron beam. The beam outlet nozzle of the apparatus is spaced about ⅛" to ½" from the surface of the glass body. To produce a cut the glass is moved relative to the beam at the rate of 10 to 60 inches per minute.

With the body, for example a pane, preheated, the body can be cut in air but a rounded bead is produced at the cut.

BRIEF DESCRIPTION OF DRAWINGS

For a better understanding of this invention both as to its organization and as to its method of operation, together with additional objects thereof, reference is made to the following description, taken in connection with the accompanying drawings, in which:

FIG. 1 is a view in transverse section, but in certain respects diagrammatic, of apparatus for practicing this invention in which the molten material, lava, fumes and dust generated during a cut, are blasted away; and FIG. 2 is a like view of apparatus for practicing this invention in which the gas in the region between the outlet nozzle of the apparatus and the material being cut is attenuated by a plasma arc.

DESCRIPTION OF APPARATUS

FIG. 1 shows apparatus for producing an electron-beam E in the atmosphere. This apparatus includes an electron-beam gun 11 having a stage 13 in which the electron beam E is generated and the conventional end stage 15, as disclosed in the above-mentioned Schopper patent, through which the beam E is brought into the atmosphere through differentially pumped intermediate chambers. One of the chambers 17 is shown pumped through a tube 18. Before the beam E enters the atmosphere it passes through a chamber 19 through which gas at higher than atmospheric pressure is fed through a tube 21. The gas and beam E emerge through the nozzle 23. The beam E impinges on the work W to be cut which may be a rock or glass or the like.

Where the cutting is carried out under water the pressure in chamber 19 prevents the water from penetrating into the interior of the gun. The pressure of the gas supplied through tube 21 may be set sufficiently high to overcome the water pressure if the cutting is taking place at a substantial depth under the water.

The apparatus shown in FIG. 1 also includes an additional nozzle 31 which is mounted under the beam-outlet nozzle 23 between this nozzle and the work W. The nozzle 31 is connected to a fluid supply 33 from which it derives a fluid such as water, steam or gas. A high-pressure jet of this fluid is projected laterally on the zone of reaction 35 of the beam E and work W, blasting away the molten rock or lava, the pulverized material and fumes formed during the cutting. The clogging of the nozzle 23 and the penetration of these products of the reaction into the gun 11 is thus prevented. The molten material is blown away by the hydrodynamic forces exerted by the fluid jet and the cutting action is improved. The jet prevents resolidification of the rock material in a glassy state. Since the gas jet is blowing at nearly a right angle to the electron beam E it also prevents spattered material from the rock from reaching the electron gun nozzle 23. When working with a water jet from nozzle 31 the cooling action of this jet on the rock material W may be undesirable, since the cutting process is based on heating and melting the rock by the corpuscular beam. This difficulty is overcome by an intermittent action, e.i., alternately turning on the electron beam and the water jet, or the electron beam E may be intermittent and jet continuous for keeping the cutting area reasonably clean. At certain intervals, when enough rock material has been melted, a gas jet may be supplemented by a strong water jet blowing the liquid material away, and at the same time producing thermal stresses by its quenching action. Also the water jet may be pulsed intermittently but the electron beam may be continuous. The last mode of operation is applied to what was called above "thermal blasting." The electron beam is maintained stationary to drill a deep hole in the face of the rock. A fluid jet is maintained to prevent the spattered rock material from interfering and damaging the electron gun nozzle. After the electron beam E has drilled a hole of the desired depth a water jet is directed into this hole to quench the white-hot walls of this cavity. The resulting thermal shock weakens or bursts rock W. The process may be repeated by moving the electron gun to a new location several inches from the first location and repeating the whole thermal blasting process. If several such holes are drilled in a circular pattern along a circle of, for instance, one foot in diameter, the one-foot core inside this circle may be loosened by this thermal blasting action and finally flushed away by high-pressure fluid jets.

To achieve the variety of beam jet action described above, the jet from the nozzle 31 is controlled by a jet control 37 and the electron beam E is controlled by an electron-beam control 39. The controls 37 and 39 can be set so that the jet and the beam are supplied continuously or intermittently or in the case of the jet, the fluid material is changed from gas to water or vice versa. Typically the beam and jet may be supplied during alternate intermittent intervals. The intervals during which the beam E is supplied are long enough to produce a substantial cut in the work W and the interval during which the jet is supplied is long enough to blast away the products of the reaction. These intermittent intervals may overlap. Alternatively, the beam may be intermittent and the jet continuous. In this case the beam pulses should be of long enough duration to produce substantial cuts. The durations between pulses should be long enough to assure blasting away of the products of the reaction before each new cut. The jet may be intermittent and the beam E continuous. In this case the jet pulses should occur frequently enough and persist long enough to blast away the products of reaction so that they do not clog the nozzle 23 and penetrate into the gun 11. Substantial quantities of these products should not be permitted to build up.

It is desirable to maintain the density of the gas between the beam outlet nozzle of the beam generating apparatus low or the gas attenuated. The gas is heated by the electron beam and its density is thereby reduced. But the gas volume traversed by the electron beam is very small and constantly replaced by turbulent gas motion; therefore the overall effect is small. To materially improve the attenuation it is desirable to heat this gas with flame or flame arc. The flame does not need to have a total energy which even remotely approaches the energy in the electron beam. Since the heat capacity of the gas is low the total energy needed for heating it, even to very high temperatures, is not great. With a modern plasma torch as they are used for cutting of metals, one can reach gas temperatures in the order of 6000° K. This corresponds to a reduction in gas density of $\frac{1}{20}$, and consequently a reduction of the energy and scatter losses in the electron beam by $\frac{1}{20}$. The working distance between the electron gun and work piece can thus be increased to distances of the order of 1″. As an additional effect, the hotter gas produces a lower flow rate into the differentially pumped chambers 19 of the electron gun, thereby reducing the requirements on the pumping capacity.

To combine a flame or plasma with the electron beam is not just a matter of adding the power available from both devices. Typically a flame can impart heat to a work piece W only by way of heat conduction. This is a somewhat slow and limited process. In contrast an electron beam imparts energy to the work piece W by way of electron penetration into as much as 1000 atomic layers, without relying on any conduction or diffusion process. There is also a characteristic difference between the energy input per unit area, or rather the energy flux per unit area which can be achieved with an electron beam and, by comparison, with a flame. The energy flux density of an electron beam is many orders of magnitude higher than the energy flux density in even the hottest plasma torch. A flame is also affected by the processes going on the surface of the work piece at which it is directed. Not so an electron beam. The electrons are not stopped by either vapor or dust clouds emerging from the work piece surface.

While the heat available from a plasma flame is beneficial to the cutting processes it should nevertheless be kept in mind that the main purpose of the flame is to achieve a greater working distance.

A flame to attenuate the gas, produced by burning methane ($CH_4$), acetylene $C_2H_2$, hydrogen or other combustible materials with air or oxygen, can be emitted through jet 31 of the apparatus shown in FIG. 1 or through an additional jet (not shown) provided for this purpose. Such a jet could have the usual multi-annular structure typical of acetylene torches. The flame can also be derived by supplying the combustible gas and the oxygen through annular spaces surrounding the end stage 15 of FIG. 1. In this case the combustible fuel is supplied through an inner ring and the oxygen through an outer ring.

FIG. 2 shows apparatus in which the gas between the beam outlet nozzle 41 of the apparatus and the work W is attenuated by a plasma flame or plasma jet 43. The plasma jet 43 is produced by apparatus analogous to the Y-plasma torch which is presently being sold by Thermal Dynamics Corporation of Hanover, N.H.

The apparatus shown in FIG. 2 includes a gun 45 having a stage 47 in which the electron beam E is generated and an end stage 49 through which the beam E is brought into the atmosphere through differentially pumped chambers 51 and 53. The apparatus includes a Y-shaped plasma generator 61. The torch has hollow arms 63 and 65 terminating in electrodes 67 and 69 respectively between which an arc-producing potential is applied. The electrodes 67 and 69 are insulated from the remainder of the corresponding arms 63 and 65 by rings 71 and 73. A suitable gas under pressure exceeding atmospheric pressure is supplied to arm 65 through a conductor 75. Gas may also be supplied through arm 63. The gas may be inert, for example helium or argon, or nitrogen, or mixtures of these gases with other gases, for example argon and hydrogen. The arms 63 and 65 are sealed to the chamber 53 and form part of this chamber.

The stem 81 of the generator 61, which is usually water cooled, is coaxial with the nozzle 41 and may in fact be the nozzle. The beam E passes through the center of the stem 81 and thus through the plasma 43.

In the use of this apparatus an arc is fired between the electrodes 67 and 69 and its plasma is projected through the stem 81 which serves to constrict the arc. The beam exit nozzle 41 of the gun 45 projects into the stem 81. The electron beam E emerges through the stem 81 coaxially with the plasma 43. The plasma heats the gas between the nozzle 41 and the work W and permits the nozzle to be spaced substantially from the work W because of the reduced density of the hot gas.

EXAMPLE I

An electron beam of 140 to 150 kv., 5 kw. was directed against (1) a concrete slab, (2) a stone of concrete plus coarse gravel, and (3) against a sandstone ("Belgian stone"). The pieces were placed on a rotating specimen table and rotated so that the beam spot traveled across the stone at a speed of 4 to 7" per minute; at some points the movement was stopped and then re-started.

A circular cut about 1" deep was made in the concrete at 7" per minute. At the cut glassy resolidification took place but with a slight force the concrete broke along the circular cut. The conglomerate concrete behaved similarly. A glassy melt formed with some bubbling over the path of the cut. The Belgian stone cracked in many places under the thermal stress, in addition to showing a circular cut. A glass melt partly green and partly colorless flowed out of the cut at the ends. Leaving the beam stationary for about one-half minute caused a cavity to develop about 3" deep and ¾" diameter.

EXAMPLE II

A block of sandstone 3¼" x 4" x 12" was placed under a gun with the exit nozzle of the gun about ¼" from the surface of the block. The gun was operated at a power of 9 kw. with the acceleration voltage of 145 kv. and the gas through the exit nozzle helium at 180 cubic feet per hour. The travel of the block was 4" per minute.

(I) A cut 2½" deep (along the travel) was produced when affluent "lava" stopped further movement.

(II) A cut 1¼" deep was produced but the break occurred to a depth of 1⅝" and across the whole width of the rock (12 inches).

(III) A slab 1⅜" thick shows a crack line over half the length of the block (6"). With a chisel and slight pounding slab 1⅜" thick lifts clearly off the block along the full length and width of the block.

EXAMPLE III

A block of granite 3½" x 5" x 8" was placed under a gun with the exit nozzle about ⅛" from the surface of the granite. The gun was operated with the parameters of Example II with the gun and block stationary. After 20 seconds of operations the block cracked through. "Lava" issued from the top of the block but caused no interference with the gun. The melt-cavity was about 3½" deep and ⅝" diameter.

EXAMPLE IV

A concrete slab 1⅞" x 4" x 5" was placed on another slab under a gun with the exit nozzle ⅜" from the surface of the work. The gun parameters were as in Example II. A cut was made to a depth of 2" with the slabs moving at 4" per minute. A cut was produced which was 5/16" wide on top and ⅜" wide at 1" level below the top. The cut passed through the top slab; burn marks were visible on the support slab. There was much moisture on the support slab. There was "lava" flowing at the start of the cut but not at the end.

EXAMPLE V

A limestone block 3½" x 5" x 12" was cut with apparatus operated at the parameters of Example II. At the start the beam was ½" inside of the edge of the block. The beam outlet nozzle was ⅜" from the surface of the block. The cutting was at the rate of 4" per minute. No "lava" flowed out in front or on top of the cut. The cut appeared clean; only a few, insufficient thermal cracks appeared. The cut was 2 1/16" deep and 3/16" wide.

EXAMPLE VI

A granite block as in Example III was placed under water. The surface was about 1" under the water level surface. The electron gun nozzle was dipped into the water to within ⅛" of the rock surface.

With 9 kw. at 140 kv. with a cutting speed of about 1"/min. the rock was cut as was a similar block before (in air) but no glass flowed out of the cutting slot. A large part of the block crumbled due to thermal stress cracking.

EXAMPLE VII

A glass pane about ⅛ inch thick was submerged under water. An electron beam generator having a rating of about 5 kw. was held with its beam-outlet nozzle under water about ⅛" to ½" from the pane. The pane was moved at between 10" and 60" per minute. A clean sharp cut of the pane was produced.

While preferred embodiments of this invention have been disclosed herein many modifications thereof are feasible. This invention then is not to be limited except insofar as is necessitated by the spirit of the prior art.

We claim as our invention:

1. The method of excavating through rocky terrain which comprises setting an apparatus for producing and projecting into the atmosphere a concentrated corpuscular beam, of electrically charged corpuscles having a high energy content per unit area, in beam-impingement relationship with the surface of the rocks of said terrain, energizing said apparatus to produce said beam, and projecting said beam on said surface to break-up said rocks, said corpuscular beam being of the type which readily penetrates the plasma produced by the vapor resulting from vaporization of said rock.

2. The method of claim 1 wherein the corpuscular beam is an electron beam.

3. The method of claim 1 wherein disruptive high thermal stresses are developed in the rock to break up the rock by projecting the beam continuously on selected areas of the rock thereby to develop high-energy localization in said areas and high stresses near said areas.

4. The method of claim 1 for cutting rocks to produce tunnel walls in rocky terrain wherein the beam is directed angularly at the rocks in successive regions of the surface of the rocks to cut out successively triangular wedge-shaped masses of said rocks thereby to form said walls.

5. The method of claim 1 wherein the rock is submerged under water and the beam is projected on the rock through the water.

6. The method of cutting a mass of rock into sections which comprises setting apparatus for producing and projecting a corpuscular beam of electrically charged corpuscles having a high energy content per unit area into the atmosphere in beam-impingement relationship with the surface of said mass, energizing said apparatus to produce said beam, projecting said beam on said surface and moving said beam and mass one relative to the other to cut said mass, said corpuscular beam being of the type which readily penetrates the plasma produced by the vapor resulting from vaporization of said rock.

7. The method of claim 6 wherein the surface is submerged under water.

8. The method of claim 6 wherein the beam outlet nozzle of the apparatus is spaced a distance of about ⅛ inch to 1 inch from the surface and the surface is submerged under water.

9. The method of claim 6 wherein the beam outlet nozzle of the apparatus is spaced a distance of about ⅛ inch to 1 inch from the surface and the surface is submerged under water, and wherein also a gas jet is projected towards the surface through the said nozzle, said jet being projected at sufficient pressure to prevent the penetration of water into the nozzle.

10. The method of claim 6 wherein the beam-exit nozzle of the apparatus is held spaced a distance of about ⅛ inch to 1 inch from the surface and a jet of fluid at substantial pressure is projected at the zone of interaction of the beam and the surface, said pressure being sufficient to blast away molten material, dust and fumes produced by the said interaction and prevent the penetration of such material, dust and fumes into the beam-exit nozzle of the apparatus.

11. The method of claim 6 wherein a jet of fluid at substantial pressure is projected at the zone of interaction of the beam and the surface, said pressure being sufficient to blast away molten material, dust and fumes produced by the said interaction and prevent the penetration of such material, dust and fumes into the beam-exit nozzle of the apparatus.

12. The method of claim 11 wherein the fluid is alternately a gaseous material and water, the gaseous material blasting away the molten material, dust and fumes and the water producing disruptive stresses in the material.

13. The method of claim 6 wherein the beam has a small angular aperture.

14. The method of claim 13 wherein the beam has an angular aperture of about 0.5 to 5 degrees.

15. The method of cutting a mass of rock into sections which comprises setting apparatus for producing and projecting a corpuscular beam, having a high energy content per unit area into the atmosphere, in beam-impingement relationship with the surface of said mass, energizing said apparatus to produce said beam, projecting said beam or said surface, moving said beam and mass one relative to the other, and projecting a jet of fluid at substantial pressure at the zone of interaction of the beam and surface, said pressure being sufficient to blast away molten material, dust and fumes produced by the said interaction and prevent the penetration of such material, dust and fumes into the beam-exit nozzle of the apparatus, at least one of the projected media, namely the jet and beam, being intermittent, the duration of each intermittent projection of a medium being such as to effectively perform its aforesaid operation and the interruption between projections being such that the other medium has effectively performed to aforesaid operation preparatory to the next projection of the intermittently projected medium.

16. The method of claim 15 wherein the fluid is water and both the jet and beam are intermittently projected, the jet and beam being on alternately, the beam cutting the surface during each alternation after the jet has blasted away the molten material.

17. The method of claim 15 wherein the jet is intermittently projected, the duration of each intermittent blast of the jet being such that the molten material is blasted away and the duration of the interruptions between blasts being such that the surface is effectively cut during said interruptions.

18. The method of claim 15 wherein the beam is intermittently projected, the duration of interruptions between successive impingements of the beam being such that the molten material is effectively blasted away during said interruptions and the durations of the impingements of said beam being such that the surface is effectively cut.

19. The method of producing a disruption in the surface of a mass of rock which comprises setting apparatus for producing and projecting a concentrated corpuscular beam of electrically-charged corpuscles, having high energy content per unit area into the atmosphere, in beam-impingement relationship with the surface of said mass, energizing said apparatus to produce said beam and projecting said beam on said rock, said corpuscular beam being of the type which readily pentrates the plasma produced by the vapor resulting from vaporization of said rock.

20. The method of claim 19 wherein the beam outlet nozzle of the apparatus is spaced from the surface of the mass and the gas in the gap between the nozzle and the surface is heated by heating means in addition to the beam itself, said heating reducing the density of said gas and to reduce the scattering of said beam by said heated gas.

21. The method of claim 20 wherein the gas in the gap is heated by a flame or a combustible gas.

22. The method of claim 20 wherein a plasma arc is produced in the region of the gap through which the beam is transmitted to the surface of the mass and the gas is heated by the plasma arc.

23. The method of claim 19 for breaking up the mass wherein the beam is set and operated to produce a deep narrow slit in the mass to cause the mass to break up.

24. The method of claim 19 for breaking up the mass, particularly where the mass is of rocky material which manifests sensitivity to thermal stress cracking or spallation, wherein the beam is produced by an accelerating voltage such that the maximum energy of the beam is released within the mass at a relatively substantial distance below the surface of the mass where the beam impinges.

25. The method of claim 24 wherein the beam is a beam of electrons and the accelerating voltage is between one million and one hundred million volts.

26. The method of claim 24 wherein the beam is a beam of electrons and is projected on the surface of the mass in intermittent pulses.

27. The method of claim 26 wherein the pulses are of short duration compared to the durations between pulses.

28. The method of claim 24 wherein the beam is a beam of electrons and is projected on the surface of the mass in intermittent pulses, the pulses being of such duration compared to the durations between pulses that the mass is not melted but is disrupted by stress cracking.

References Cited

UNITED STATES PATENTS

| | | | |
|---|---|---|---|
| 2,781,754 | 2/1957 | Aitchison et al. | 125—1 |
| 2,866,622 | 12/1958 | Murray | 175—16X |
| 3,004,137 | 10/1961 | Karlovitz | 175—16X |
| 3,351,731 | 11/1967 | Tanaka | 219—121X |
| 3,393,289 | 7/1968 | Duhamel et al. | 219—121 |

OTHER REFERENCES

"Granite Softened by Infrared Laser," The Washington Post, p. D4, Nov. 24, 1966.

"Novel Drilling Techniques," by William C. Maurer, pp. 84–86, Pergamon Press, 1968.

ERNEST R. PURSER, Primary Examiner

U.S. Cl. X.R.

125—1; 175—16; 219—121; 241—1